Patented June 14, 1927.

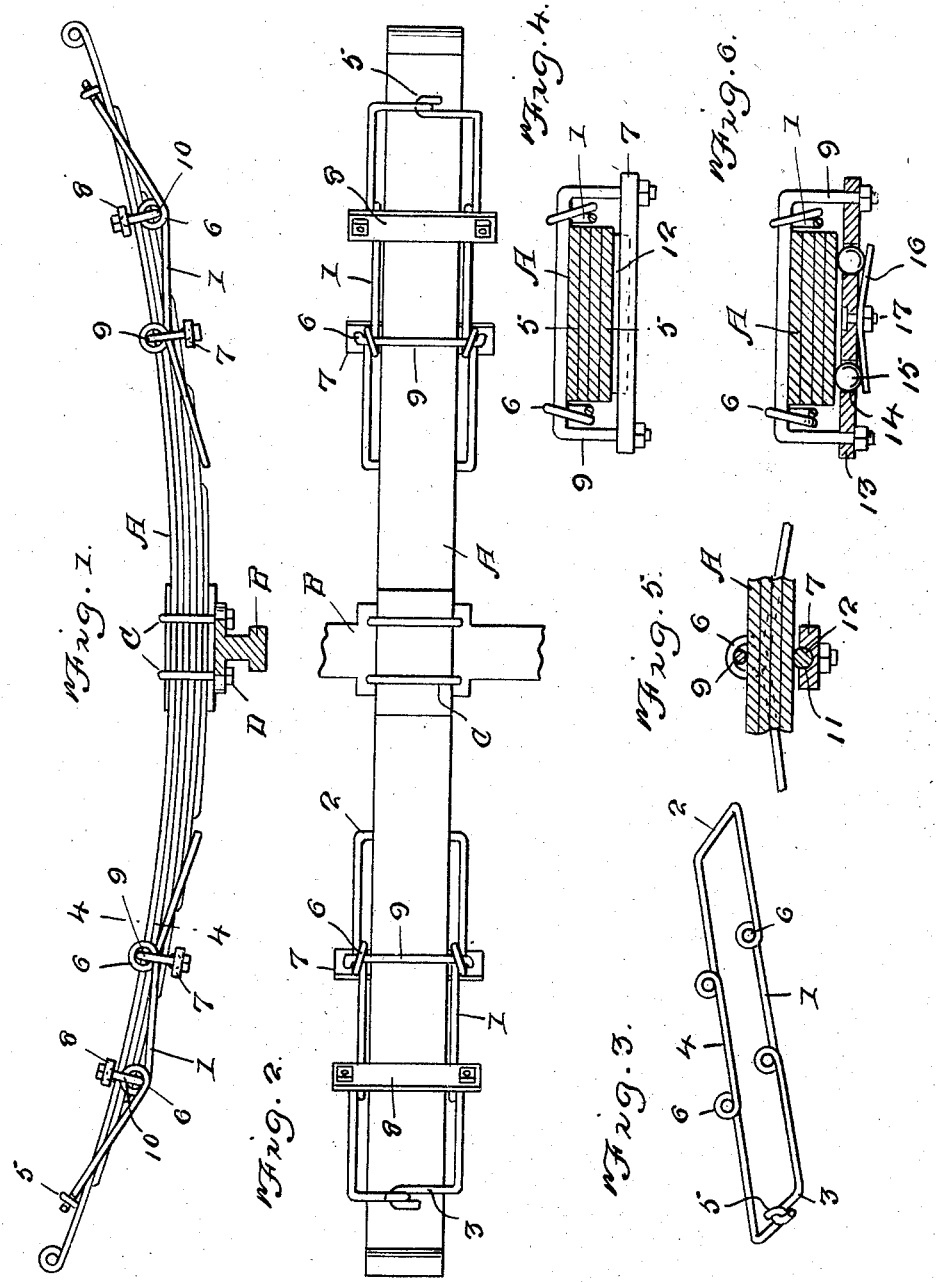

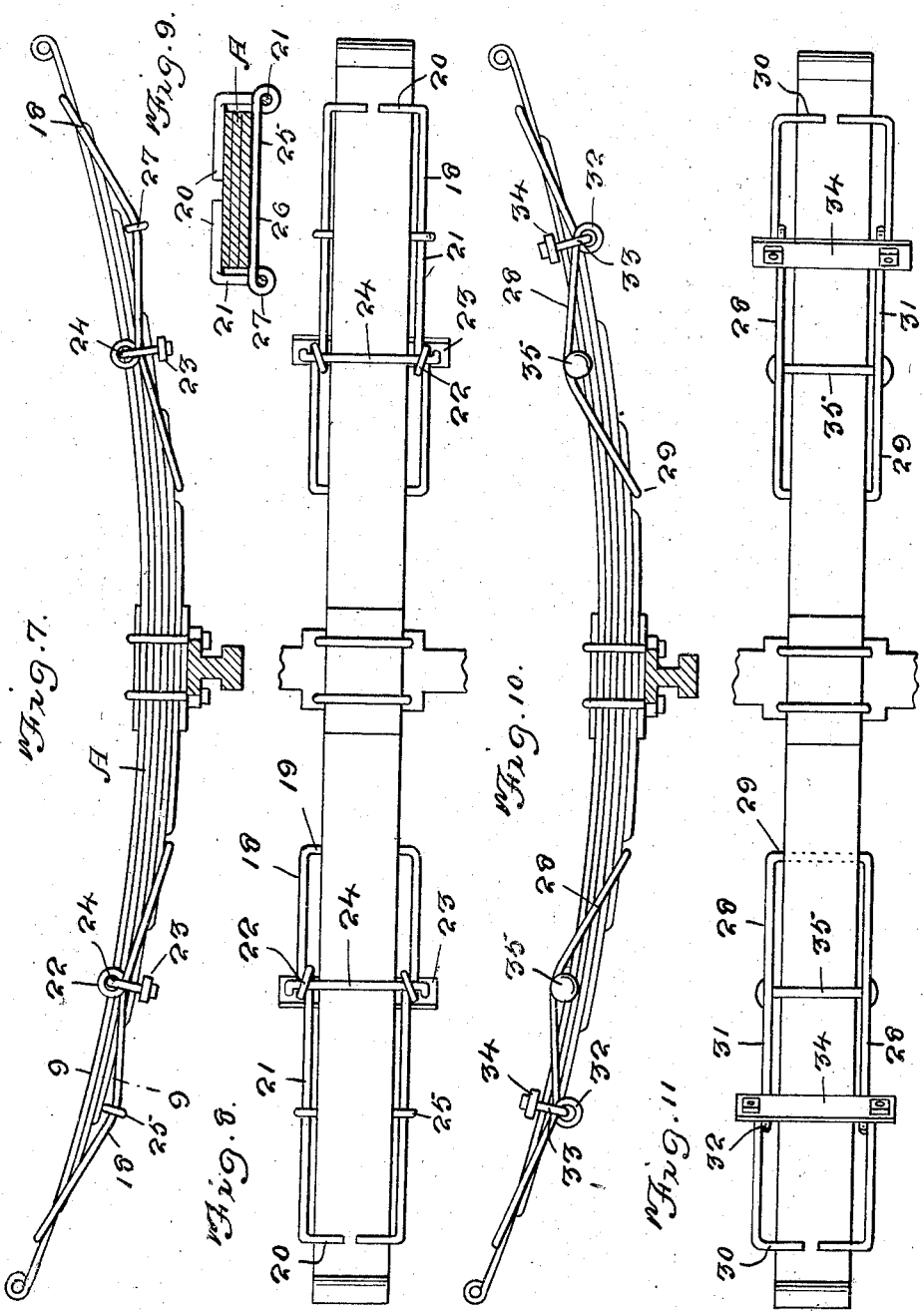

1,632,715

UNITED STATES PATENT OFFICE.

DANIEL C. RODGERS, OF CANTON, OHIO.

SHOCK ABSORBER.

Application filed May 26, 1926. Serial No. 111,832.

This invention relates to shock absorbers designed for use in connection with the springs of motor vehicles, aeroplanes or any other suspension spring devices, the purpose of the invention being to increase the resilience and shock absorbing as well as rebound absorbing qualities of the spring.

A very important object of the invention is to provide a shock absorber which may be quickly and easily engaged upon or associated with an already existing spring without involving any changes in the construction or mounting of the spring itself, the device being consequently manufactured as a complete and separate entity adapted to be engaged upon the springs of vehicles by very simple securing means so constructed and arranged that the attachment will be held firmly in place even under severe road conditions.

A more specific object is to provide a shock absorber which embodies a spring element which is capable of being formed from a single length of resilient rod or the like to which must, of course, be added certain auxiliary devices such as securing bolts or the like whereby the structure may be effectively clamped in place upon a vehicle spring so as to fulfill its proper function.

Yet another object is to provide a detailed device which may vary in construction under some instances, depending upon the preference of the manufacturer, the principle involved being however the same throughout all the modifications.

An additional object is to provide a device or attachment of this character which will be simple and inexpensive to manufacture, easy to apply, positive in action, efficient and durable in service, and a general improvement in the art.

With the above and other objects and advantages in view, the invention consists in the details of construction and the arrangement and combination of elements to be hereinafter more fully described and claimed, and illustrated in the accompanying drawings, in which:—

Figure 1 is an elevation of a spring equipped with one form of my device.

Figure 2 is a top plan view thereof.

Figure 3 is a detail perspective view of one of the shock absorbing elements alone and detached.

Figure 4 is a detail section taken on the line 4—4 of Figure 1.

Figure 5 is a detail section taken on the line 5—5 of Figure 4.

Figure 6 is a view similar to Figure 4, but showing a slight modification.

Figure 7 is an elevation or view similar to Figure 1 showing another form of the invention.

Figure 8 is a top plan view thereof.

Figure 9 is a detail in cross section on the line 9—9 of Figure 7.

Figure 10 is a front elevation of still another form of the invention, and

Figure 11 is a top plan view thereof.

Referring more particularly to the drawings and especially Figures 1 to 5 inclusive, the letter A designates a leaf spring of the type commonly used in connection with motor vehicles, which spring is ordinarily mounted upon the axle B by means of U-bolts C equipped with suitable nuts D.

In carrying out the form of the invention, disclosed in these figures, I provide near each end portion of the spring A, an auxiliary spring device designated generally by the numeral 1, this spring device being formed preferably from a single length of suitable tempered wire or rod of proper gage bent into elongated rectangular form to provide end portions 2 and 3 and sides 4. The end portions 3 terminate in interengaging hooks 5 while the sides 4 are formed at spaced points with coils or loops 6. In applying this auxiliary spring device 1 to each end of the main spring A, the end 2 is engaged beneath the spring A while the interengaged ends 3 are engaged over the top thereof. Use is made of elongated plates 7 and 8 disposed respectively below and above the spring A, the spring 7 carrying a U-bolt 9 which extends through one pair of loops or eyes 6. The plate member 8 carries a depending U-bolt 10, which extends beneath the spring A and through the other pair of eyes or loops 6 as clearly shown in the drawings. It is preferable that the plate member 7 beneath the spring be longitudinally grooved or recessed as indicated at 11 for the reception of a roller 12 which fits therein and which bears against the underside of the lowermost leaf of the spring assembly A.

Instead of providing a roller at this point, a plate 13 may be used instead of the plate 7, this plate 13 having openings 14 therethrough within which are engaged bearing balls 15 and held in place by a leaf spring 16 suitably anchored at the center of the plate 13 as by a bolt 17.

In Figures 7, 8 and 9, I have illustrated a modified form of the invention, in which use is made of an auxiliary spring device 18 which is likewise of elongated rectangular formation and which is made from a single length of spring wire or rod of suitable gage bent to define an end portion 19 and a pair of ends 20, the former being disposable against the spring A and the latter against the top thereof, the latter being furthermore in slightly spaced relation as indicated in Figure 8. The auxiliary spring 18 further includes sides 21 formed intermediate their ends with loops 22 located at the sides of the spring A. Securing is effected in this instance by means of a plate 23 disposed against the underside of the spring assembly A and carrying an upstanding U-bolt 24 passing through the loops or eyes 22 and engaging upon the top of the spring assembly. I also provide a tie device 25 which is likewise formed from a single length of wire bent to define an elongated portion 26 disposed against the underside of the spring A between the plate 23 and the ends 20, this member 25 being formed with coils 27. The tie device 25 is engaged beneath the spring A with the loops or eyes 27 receiving the sides 21 of the auxiliary spring device 18.

In Figures 10 and 11, I have disclosed yet another modification in which the plate 23 and bolts 24 as well as the tie device 25 are all omitted. In this form of the invention, the auxiliary spring device 28, though of rectangular form and including an end 29 and spaced ends 30 has its sides 31 formed with loops 32 located at the sides of the spring A and engaged by a U-bolt 33 which extends downwardly from a plate 34 disposed on the top of the spring A. This bolt 33 and plate 34 will be located at about the same point occupied by the tie device 25 in the form shown in Figures 7 to 9 inclusive. At a point where the U-bolt 24 was provided in the above mentioned figures, I have disclosed, in Figures 10 and 11, a simple bolt or double headed rivet 35 resting upon the top of the spring A and engaging beneath the upwardly flexed sides 31.

In all forms of the invention, it is preferable that the same auxiliary spring device be located at both ends of the main or leaf spring. Furthermore, in all forms it is clear that the operation will be the same inasmuch as the pressure at one end of the auxiliary device is downwardly upon the top of the spring A near its end while the pressure at the other end of the auxiliary device is upwardly against the leaf spring.

In all instances there are provided two fulcrum points for the sides of the auxiliary devices so that there will be a double leverage exerted and as these auxiliary devices have considerable natural resilience it is obvious that they will greatly assist the main or ordinary springs and give them greater resilience as well as greater shock absorbing and rebounding preventing qualities. It is really thought that the construction, operation and advantages will be readily apparent to one skilled in the art without further explanation.

While I have shown and described the preferred embodiment of the invention, it should be understood that I reserve the right to make such changes in the form, construction and arrangement of parts as will not depart from the spirit of the invention or the scope of the subjoined claims.

Having thus described the invention, I claim:

1. A shock absorbing attachment for a vehicle spring, comprising an elongated substantially rectangular resilient spring member having one end disposed beneath and its other end disposed above the spring, and means engaging said spring member at the sides thereof for effecting flexure thereof.

2. A shock absorbing attachment for a vehicle spring, comprising an elongated spring member having one end disposed beneath and the other end disposed above the vehicle spring, and fulcrum elements engaging the sides of the spring member at spaced points and located respectively above and below the vehicle spring for flexing portions of the sides of the spring member in different directions.

3. A shock absorbing attachment for a vehicle spring, comprising an elongated spring member located at each end of the vehicle spring and each having one end engaging beneath and the other end engaging above the vehicle spring, the sides of the spring member being formed with loops or eyes, transversely arranged elements extending through said eyes and other transversely extending tie means engaging the sides of the spring member for confining the same toward the vehicle spring and effecting flexure.

4. A shock absorbing attachment for a vehicle spring, comprising an elongated spring member of substantially rectangular shape having one end disposed beneath the vehicle spring and its other end disposed above the same, and means engaging the vehicle spring and the spring member at intermediate points of the latter for effecting flexure thereof upon movement of the vehicle spring.

In testimony whereof I affix my signature.

DANIEL C. RODGERS.